(12) United States Patent
Bueyuekasik

(10) Patent No.: US 12,176,762 B2
(45) Date of Patent: Dec. 24, 2024

(54) ELECTRIC MACHINE

(71) Applicant: Robert Bosch GmbH, Stuttgart (DE)

(72) Inventor: Diyap Bueyuekasik, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 17/769,031

(22) PCT Filed: Oct. 12, 2020

(86) PCT No.: PCT/EP2020/078528
§ 371 (c)(1),
(2) Date: Apr. 14, 2022

(87) PCT Pub. No.: WO2021/078545
PCT Pub. Date: Apr. 29, 2021

(65) Prior Publication Data
US 2023/0336063 A1  Oct. 19, 2023

(30) Foreign Application Priority Data

Oct. 23, 2019 (DE) ...................... 10 2019 216 273.8

(51) Int. Cl.
*H02K 1/2791* (2022.01)
*H02K 21/22* (2006.01)
(Continued)

(52) U.S. Cl.
CPC ........... *H02K 1/2791* (2022.01); *H02K 21/22* (2013.01); *H02K 21/28* (2013.01); *H02K 29/03* (2013.01)

(58) Field of Classification Search
CPC ...... H02K 1/2791; H02K 21/22; H02K 21/28; H02K 29/03
See application file for complete search history.

(56) References Cited

U.S. PATENT DOCUMENTS

| 2009/0127958 | A1 | 5/2009 | Honkura et al. | |
| 2015/0270750 | A1* | 9/2015 | Totoki | H02K 1/2781 |
| | | | | 310/156.53 |
| 2018/0191213 | A1* | 7/2018 | Buehler | H02K 29/03 |

FOREIGN PATENT DOCUMENTS

| DE | 10246719 A1 * | 4/2004 | ........... H01F 13/003 |
| DE | 102006013963 A1 | 10/2007 | |

(Continued)

OTHER PUBLICATIONS

Translation of International Search Report for Application No. PCT/EP2020/078528 dated Jan. 27, 2021 (2 pages).

*Primary Examiner* — Tulsidas C Patel
*Assistant Examiner* — Mohammed Ahmed Qureshi
(74) *Attorney, Agent, or Firm* — Michael Best & Friedrich LLP

(57) ABSTRACT

The invention relates to an electric machine comprising a permanent magnet arrangement and an electromagnetic arrangement. The electromagnetic arrangement comprises a first number of excitation coils, each excitation coils being wound around a pole core. The permanent magnet arrangement comprises a second number of magnet segments formed of a permanently magnetic material. An air gap is arranged between the electromagnet arrangement and the permanent magnet arrangement. The magnet segments have a permanent magnetisation in a first magnet segment volume. At least one magnet segment comprises a demagnetised region in a second magnet segment volume.

14 Claims, 6 Drawing Sheets

(51) Int. Cl.
*H02K 21/28* (2006.01)
*H02K 29/03* (2006.01)

(56) References Cited

FOREIGN PATENT DOCUMENTS

| | | | |
|---|---|---|---|
| DE | 112013006518 T5 | 10/2015 | |
| DE | 102017221030 A1 | 5/2019 | |
| WO | WO-2007110265 A1 * | 10/2007 | ............... H02K 1/17 |
| WO | 2017001159 A1 | 1/2017 | |

* cited by examiner

ELECTRIC MACHINE

BACKGROUND

The invention relates to an electric machine, for example a generator or an electric motor, comprising a permanent-magnet arrangement and an electromagnet arrangement. The invention further relates to a production method for such an electric machine.

Electric machines of this kind are used in a variety of technical applications. In so doing, provision can be made for the permanent-magnet arrangement to be associated with a rotor and for the electromagnet arrangement to be associated with a stator. As an alternative, the permanent-magnet arrangement can be associated with a stator and the electromagnet arrangement can be associated with a rotor.

Electric motors in which the rotor has a plurality of magnet segments formed from a permanent-magnetic material and fastened to a magnetic return path ring are known, amongst others. However, the stator has a number of field coils which are each wound around a pole core. In an electric machine of this kind, a specific ripple can be observed in the torque generated. This torque ripple, which manifests itself as an angle-dependent deviation in the torque of the motor given a constant current, is the result of what is known as cogging of the motor and can be attributed to magnetic interaction between the stator poles and the rotor poles. The torque ripple periodically superimposed on the shaft torque of the motor can, however, have a negative effect on the rotation speed control and the working process, depending on the field of use of the electric machine. In such a case, a reduction in the cogging and the torque ripple in the electric machine is desirable. In order to achieve this, the end sections of the magnet segments can be shaped in a targeted manner. For example, what are known as detached pole portions can be created by appropriate flattening of the end sections of the magnet segments, these detached pole portions allowing a more favorable magnetic transition between the magnet segments. Given an arrangement of eight poles and eight segments, 16 detached pole portions are accordingly provided. In order to further reduce the torque ripple or the cogging, further design measures can be taken, for example by way of additional recesses in the magnet segments between the end sections. Such an electric machine is disclosed, for example, in document WO 2017/001 159 A1.

However, on account of the mechanical robustness of the magnet segments, not all the desirable recesses can be realized since otherwise the structure of the permanent-magnetic material would be weakened in such a way that the magnet segments can break. Furthermore, not all shapes of the recesses can be technically implemented.

SUMMARY

One object of the invention is to provide an electric machine in which the torque ripple and the cogging are reduced, without affecting the mechanical robustness of the magnet segments. A further object of the invention is to provide a production method for such an electric machine.

An electric machine has a permanent-magnet arrangement and an electromagnet arrangement. The electromagnet arrangement has a first number of field coils which are each wound around a pole core. The permanent-magnet arrangement has a second number of magnet segments formed from a permanent-magnetic material, wherein an air gap is arranged between the electromagnet arrangement and the permanent-magnet arrangement. The magnet segments have a permanent magnetization in a first magnet segment volume. At least one magnet segment has a demagnetized region in a second magnet segment volume.

Instead of the detached pole portions or recesses disclosed in the prior art, the key concept of the invention is therefore to not remove any permanent-magnetic material but rather not to magnetize or to demagnetize subregions of the permanent-magnetic material in order to maintain the mechanical robustness of the magnet segments but despite this to create regions of weaker total magnetization. As a result, a mechanically more robust permanent-magnet arrangement can be provided. In this case, the demagnetized regions can be arranged such that the permanent-magnet arrangement can substantially have a magnetic-field profile identical to the known permanent-magnet arrangement with recesses and detached pole portions. As an alternative however, other configurations which cannot be achieved using recesses are also feasible.

In this case, permanent-magnetic materials can comprise, in particular, iron, nickel or cobalt as well as alloys of said metals and also hard-magnetic ferrites.

In one embodiment of the electric machine, all the magnet segments have a demagnetized region in a second magnet segment volume. As a result, in particular, a permanent-magnet arrangement whose magnetic field profile corresponds to the permanent-magnet arrangements known from the prior art can be provided.

In one embodiment of the electric machine, the permanent-magnet arrangement is arranged outside the electromagnet arrangement. The permanent-magnet arrangement has an encircling magnetic return path element, wherein the magnet segments are arranged on the return path element. This renders possible simple production of the permanent-magnet arrangement, wherein the return path element both facilitates field line guidance of the magnetic field lines of the magnetic field profile of the permanent-magnet arrangement and also serves as a mechanical carrier for the magnet segments or the permanent-magnetic material. In this case, the return path element can likewise be formed from a permanent-magnetic material.

In one embodiment of the electric machine, a plurality of magnet segments form a magnet unit. As a result, a production method can be further simplified. A magnet unit has, for example, an even number of magnet segments, where a magnetic polarity of the magnet segments alternates. As an alternative, a magnet unit can have an uneven number of magnet segments, where the magnetic polarity of the magnet segments likewise alternates.

In one embodiment of the electric machine, the demagnetized region is arranged at a transition between two magnet segments of a magnet unit. In this case, the demagnetized region can have a second magnet segment volume which extends over the two magnet segments.

In one embodiment of the electric machine, a magnet segment has an axially obliquely running permanent magnetization. As a result, the torque ripple and the cogging can be further reduced.

In one embodiment of the electric machine, a magnet segment has a magnet segment surface. The magnet segment surface, on account of the permanent magnetization and the demagnetized region, has a transition from a first permanent-magnetic field strength to a second permanent-magnetic field strength. Provision can be made for a permanent magnetization to be present in adjoining regions close to the demagnetized region in spite of this. The second permanent-magnetic field strength is then not equal to zero, but its magnitude is less than that of the first permanent-magnetic field strength on account of the demagnetized region. Furthermore, a corresponding profile of the first and the second permanent-magnetic field strength indicates the presence of corresponding demagnetized regions.

In one embodiment of the electric machine, the permanent-magnet arrangement is arranged on a rotor of the electric machine. The electromagnet arrangement is arranged on a stator of the electric machine. A magnetic field of the electromagnet arrangement is reversed by means of reversing the polarity of the field coils. The electric machine can then be realized with few moveable parts, as a result of which a cost-effective production method is possible.

In one embodiment of the electric machine, the permanent-magnet arrangement is arranged on a stator of the electric machine. The electromagnet arrangement is arranged on a rotor of the electric machine. A magnetic field of the electromagnet arrangement is reversed by means of a commutator.

In this case, the electric machine can be configured as a generator and/or electric motor. In particular, the electric machine can be an electric motor for a window winder or sliding roof drive, a seat adjuster, an ABS or ESP motor, a fuel or coolant pump or a motor cooling fan of a vehicle. Furthermore, such an electric motor can be used in a windshield wiper motor, in steering motors and in other actuators (for example transmission actuator or the like). Further applications are likewise conceivable.

In a method for producing an electric machine, the following steps are carried out:
  providing an electromagnet arrangement having a first number of field coils, wherein the field coils are each wound around a pole core;
  providing a permanent-magnet arrangement, wherein the permanent-magnet arrangement has a second number of magnet segments formed from a permanent-magnetic material, wherein the magnet segments have a permanent magnetization in a first magnet segment volume, wherein at least one magnet segment has a demagnetized region in a second magnet segment volume;
  arranging the electromagnet arrangement and the permanent-magnet arrangement in such a way that an air gap is arranged between the electromagnet arrangement and the permanent-magnet arrangement.

The electric machine according to the invention can be produced using such a method, wherein the electric machine can be constructed in the manner explained in the embodiments.

In one embodiment of the method, the permanent-magnet arrangement is provided by way of the permanent-magnet material initially being magnetized by means of a first current flow in a coil arrangement for creating the magnet segments and the demagnetized region then being created in at least one magnet segment by means of a second current flow in the coil arrangement or a further coil arrangement. This renders possible a simple process with which initially a magnetization of the permanent-magnetic material is created. The magnetization created can be partially removed again by means of the second current flow. The removal can also be referred to as cancelation or demagnetization.

The prior art discloses using a coil arrangement for creating the magnet segments of the permanent-magnet arrangement. In this case, provision can be made for the permanent-magnetic material to have detached pole portions and recesses, wherein no magnetization takes place in these regions on account of the lack of material. According to the invention, a demagnetized region is created by means of the second current flow, so that the permanent-magnetic material does not have to have any recesses or detached pole portions and therefore can be configured in a mechanically more robust manner.

In one embodiment of the method, the first current flow comprises a semi-sinusoidal current pulse. The second current flow comprises an oscillating current pulse with an exponentially decreasing amplitude. With such a configuration, the first current flow can lead to a permanent magnetization and the second current flow can lead to a demagnetization.

A permanent-magnet arrangement comprises a number of magnet segments formed from a permanent-magnetic material. The magnet segments have a permanent magnetization in a first magnet segment volume. At least one magnet segment has a demagnetized region in a second magnet segment volume. The permanent-magnet arrangement can be modified in accordance with the embodiments described above.

In a method for producing a permanent-magnet arrangement, a permanent-magnetic material is initially provided. Magnet segments are then created by means of a first current flow in a coil arrangement by way of the permanent-magnetic material being magnetized. A demagnetized region is then created in at least one magnet segment by means of a second current flow in the coil arrangement or a further coil arrangement.

BRIEF DESCRIPTION OF THE DRAWINGS

Exemplary embodiments of the invention will be explained with reference to the following drawings. In the schematic drawings.

DETAILED DESCRIPTION

Figure 1:
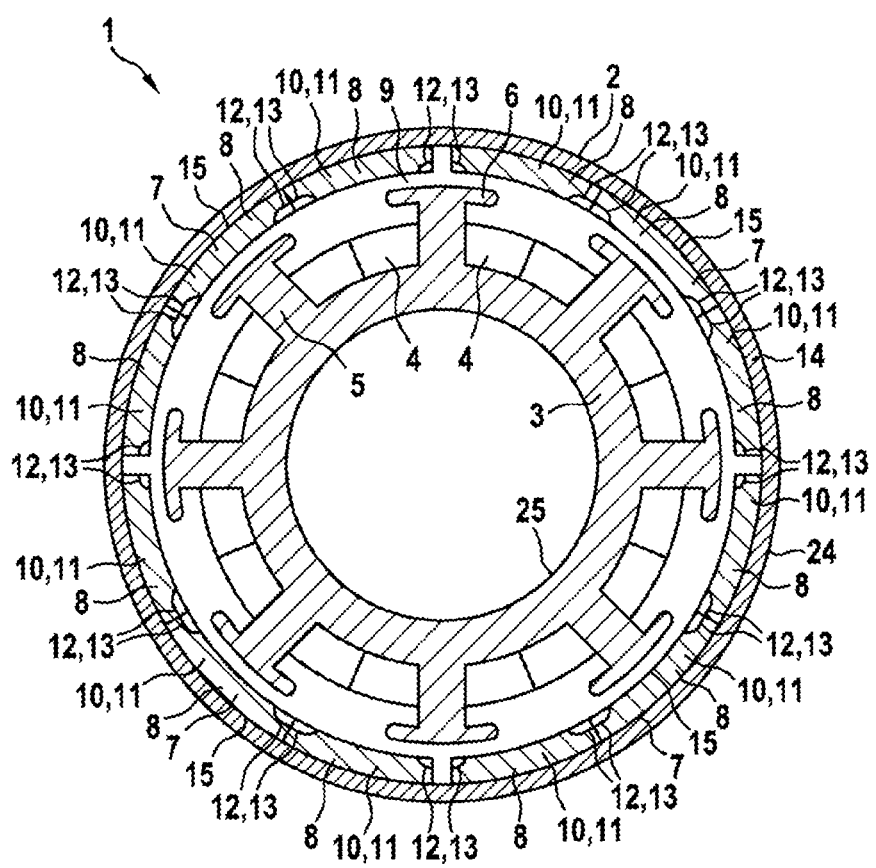
FIG. 1 shows a cross section through an electric machine.

FIG. 1 shows a cross section through an electric machine 1 having a permanent-magnet arrangement 2 and an electromagnet arrangement 3. The electromagnet arrangement 3 has eight field coils 4 which are each wound around a pole core 5. For reasons of clarity, reference signs 4 and 5 are illustrated only for one field coil 4 and one coil core 5 in FIG. 1, with corresponding reference signs being omitted. It is also possible for more than or fewer than eight field coils 4 and pole cores 5 to be provided, in particular a first number. The pole cores 5 additionally have optional pole shoes 6, which can also be omitted, however. The permanent-magnet arrangement 2 has twelve magnet segments 8 formed from a permanent-magnetic material 7, wherein an air gap 9 is arranged between the electromagnet arrangement 3 and the permanent-magnet arrangement 2. The magnet segments 8 have a permanent magnetization 11 in a first magnet segment volume 10. The magnet segments 8 further have a demagnetized region 12 in a second magnet segment volume 13. In FIG. 1, all the magnet segments 8 have a demagnetized region 12. Provision can be made for only one of the magnet segments 8 or a plurality of, but not all of, the magnet segments 8 to have a corresponding demagnetized region 12. A different number of magnet segments 8 can also be provided, in particular a second number of magnet segments 8.

The magnet segments 8 are each arranged on an optional return path element 14, likewise illustrated in FIG. 1. The return path element 14 is configured as a cylindrical return path ring. The magnet segments 8 are of shell-like design and have profiles in the form of a segment of a circle. However, other configurations are likewise conceivable. The permanent-magnet arrangement 2 is arranged outside the electromagnet arrangement 3. As an alternative, the electromagnet arrangement 3 can also be arranged outside the permanent-magnet arrangement 2.

The permanent-magnet arrangement 2 is arranged on a rotor 24 of the electric machine 1, while the electromagnet arrangement 3 is arranged on a stator 25 of the electric machine 1. A magnetic field of the electromagnet arrangement 3 can be reversed by means of reversing the polarity of the field coils 4.

The first number and the second number are different in FIG. 1. Provision can also be made for the first number and the second number to be the same, for example twelve magnet segments 8 and also twelve field coils 4 with a pole core 5 and a pole shoe 6 can be provided.

Figure 2:
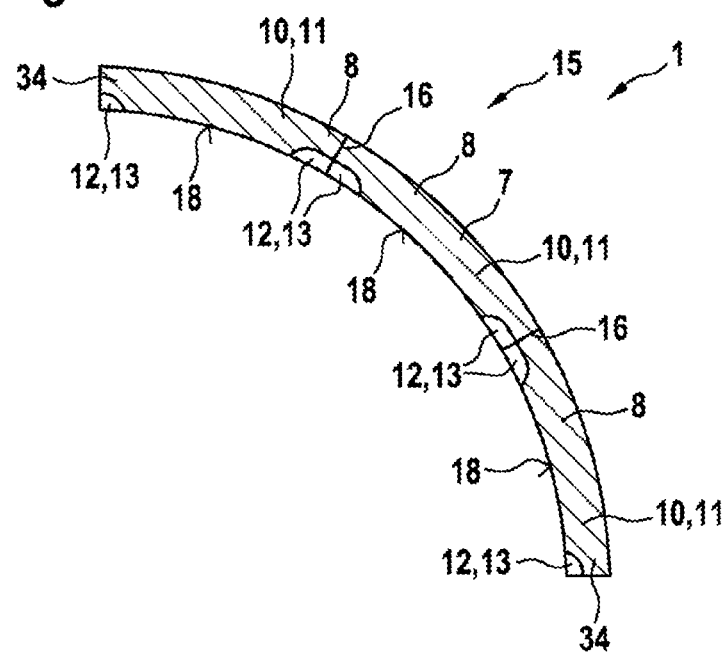
FIG. 2 shows a cross section through a magnet unit.

FIG. 2 shows a cross section through three magnet segments 8 which correspond to the magnet segments 8 of FIG. 1, provided that no differences are described below. The three magnet segments 8 form a magnet unit 15. Provision can be made for the second number of magnet segments 8 to be arranged in a third number of magnet units 15, wherein the second number is a multiple of the third number. For example, as illustrated in FIGS. 1 and 2, three magnet segments 8 can form a respective magnet unit 15 and four magnet units 15 can be provided. Furthermore, three magnet units 15 each having four magnet segments 8 can be provided as an alternative. If the second number is not twelve, three magnet units 15 each having six magnet segments 8 can also be provided, for example. In this case, the second number has to be even, but the third number has to be so only if an uneven number of magnet segments 8 are provided for each magnet unit 15.

The demagnetized regions 12 are arranged at a transition 16 between two magnet segments 8. Furthermore, demagnetized regions are arranged at ends 34 of the magnet unit 15. In this case, for example, the demagnetized regions 12 arranged at the transitions 16 can be omitted. As an alternative, the demagnetized regions 12 arranged at the ends 34 can be omitted. In addition or as an alternative, further demagnetized regions, not illustrated, can be provided, these not being arranged either at the ends 34 or at the transitions 16. The magnet segments 8 each have a magnet segment surface 18 which faces inward. In the electric machine 1 of FIG. 1, the magnet segment surfaces 18 therefore face the electromagnet arrangement.

Figure 3:
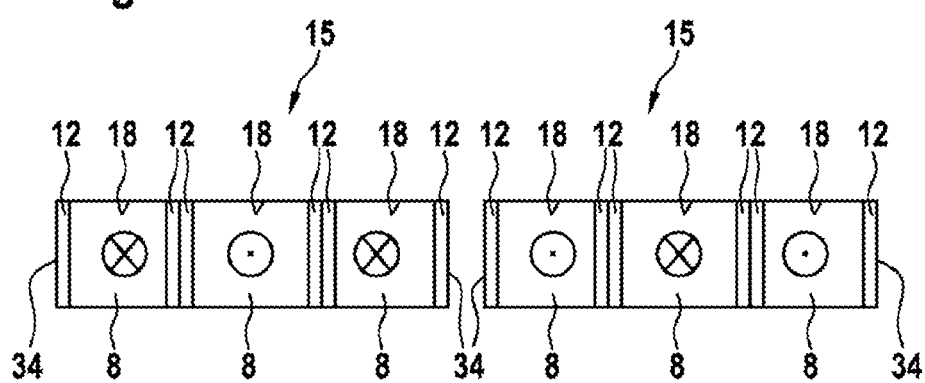
FIG. 3 shows a plan view of a magnet unit.

FIG. 3 shows a plan view of a surface of two magnet units 15 arranged next to one another and each having three magnet segments 8 arranged next to one another, wherein the magnet units correspond to the magnet units 15 of FIGS. 1 and 2, provided that no differences are described below. The plan view is compressed in this case. The illustration which is customary in relation to magnetic fields indicates which of the magnet segments 8 have a magnetic field entering the magnet segment 8 (circle with cross inside) and which of the magnet segments 8 have a magnetic field emerging from the magnet segment 8 (circle with a dot inside). The magnet segments 8 are arranged on the two magnet units 15 in such a way that magnet segments 8 with an entering and an emerging magnetic field alternate. A demagnetized region 12 is once again arranged at the transitions 16 and at the ends 34. Two further magnet units 15 can be provided in order to provide the permanent-magnet arrangement 2 of FIG. 1.

Figure 4:
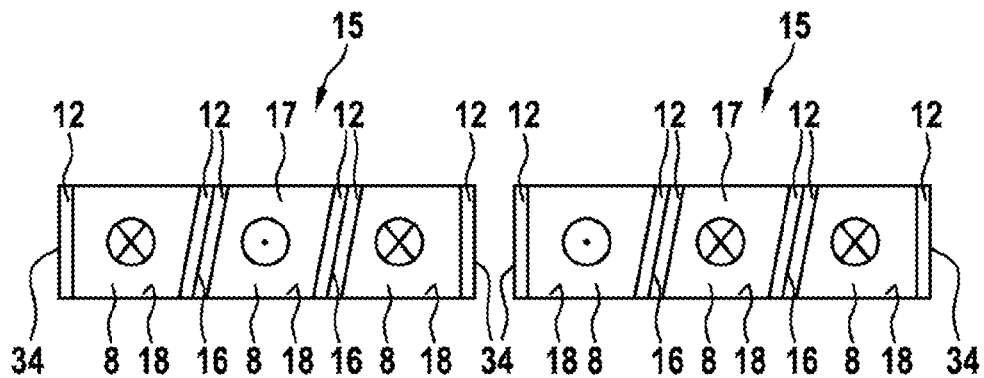
FIG. 4 shows a plan view of a further magnet unit.

FIG. 4 shows a plan view of a surface of two further magnet units 15 arranged next to one another and corresponding to the magnet units 15 of FIG. 3, provided that no differences are described below. The respective central magnet segment 8 has an axially obliquely running permanent magnetization 17. This means that the transitions 16 between the magnet segments 8 are not parallel to the ends 34, but rather are arranged at an angle. This renders possible a further reduction in torque ripple and cogging of the electric machine 1.

Figure 5:
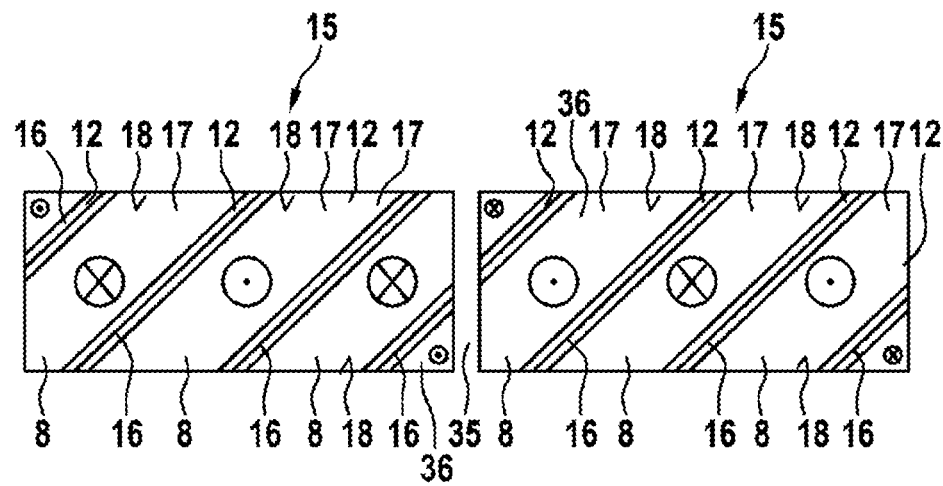
FIG. 5 shows a plan view of a further magnet unit.

FIG. 5 shows a plan view of a surface of two further magnet units 15 arranged next to one another and corresponding to the magnet units 15 of FIG. 4, provided that no differences are described below. A gap 35 is arranged between the magnet units 15, wherein one transition 16 is routed across the gap 35. This means that regions 36 respectively adjoining the gap 35 are present, the regions being magnetized analogously to the magnet segment 8 situated opposite the gap 35 and being separated from the magnet segment 8, which is situated on the same side of the gap 35 as the region 36, by means of a demagnetized region 12.

Figure 6:
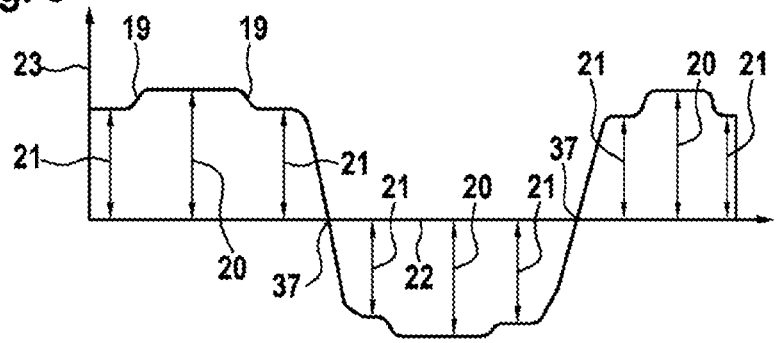
FIG. 6 shows a magnetic field profile.

FIG. 6 shows a graph of a profile of a magnetic field strength on the one magnet segment surface 18 which can correspond to the magnet segment surfaces 18 described above. A location 22 on the magnet segment surface 18 is plotted on one axis, wherein the location 22 corresponds in the graph to a position moving to the right in the illustrations of FIGS. 3 to 5. The magnetic field strength 23 measured on the magnet segment surface 18 is plotted on a further axis. In this case, a first permanent-magnetic field strength 20 can be seen in the central region of the magnet segment surface 18, while a second permanent-magnetic field strength 21 can be seen in outer regions. Therefore, the magnet segment surface 18, on account of the permanent magnetization 11 and the demagnetized region 12, has a transition 19 from the first permanent-magnetic field strength 20 to the second permanent-magnetic field strength 21. Therefore, on account of the demagnetized region 12, the magnetic field strength 23 is weakened since a permanent magnetization 11 is present beneath the demagnetized region 12.

Furthermore, the graph of FIG. 6 illustrates the way in which the magnetic field of the magnet segment surfaces 18 runs between a plurality of magnet segments 8. After a zero crossing 37, the magnetic field profile is fundamentally identical, but with a negative sign. After a further zero crossing 37, the magnetic field is positive again.

Figure 7:
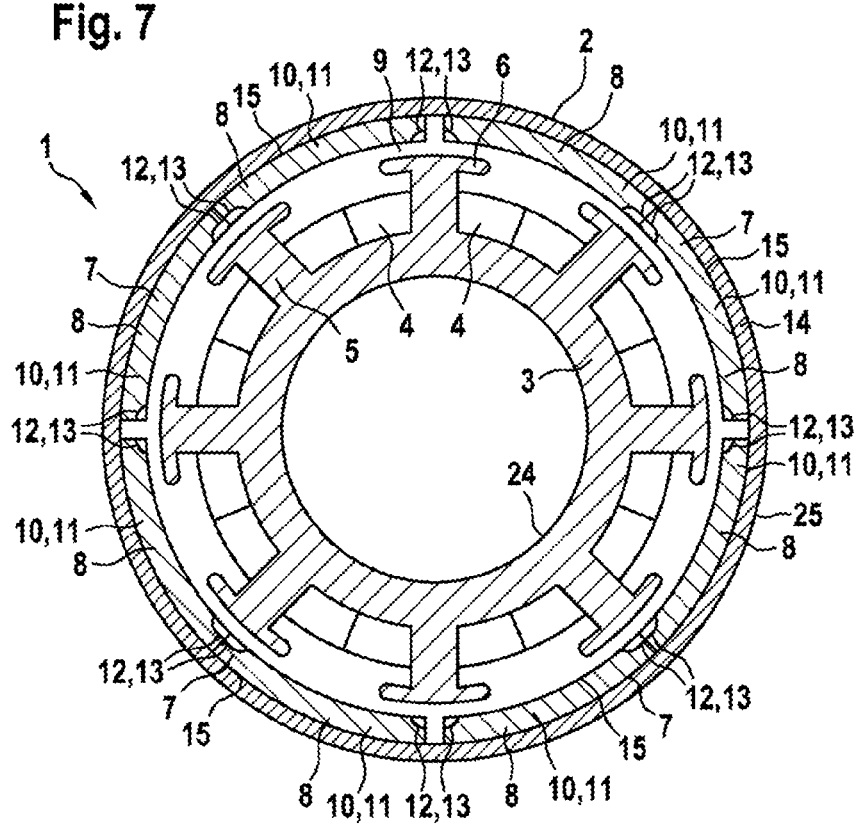
FIG. 7 shows a cross section through a further electric machine.

FIG. 7 shows a cross section through a further electric machine 1, which corresponds to the electric machine of FIG. 1, provided that no differences are described below. The permanent-magnet arrangement 2 is arranged on a stator 25 of the electric machine 1, while the electromagnet arrangement 3 is arranged on a rotor 24 of the electric machine 1. A magnetic field of the electromagnet arrangement 3 can be reversed by means of a commutator, not illustrated, known from the prior art. Furthermore, each magnet unit 15 has only two magnet segments 8, so that the permanent-magnet arrangement 2 has a total of only eight magnet segments 8.

In this case, permanent-magnetic materials of the electric machines 1 of FIGS. 1 and 7 can comprise, in particular, iron, nickel or cobalt as well as alloys of said metals and also hard-magnetic ferrites.

In order to produce the electric machine 1 of FIG. 1 or 7, an electromagnet arrangement 3 having a first number of field coils 4 is initially provided, wherein the field coils 4 are each wound around a pole core 5. A permanent-magnet arrangement 2 is then provided, wherein the permanent-magnet arrangement 2 has a second number of magnet segments 8 formed from a permanent-magnetic material 7. The magnet segments 8 have a permanent magnetization 11 in a first magnet segment volume 10. At least one magnet segment 8 has a demagnetized region 12 in a second magnet segment volume 13. The electromagnet arrangement 3 and the permanent-magnet arrangement 2 then are arranged in such a way that an air gap 9 is arranged between the electromagnet arrangement 3 and the permanent-magnet arrangement 2.

Figure 8:
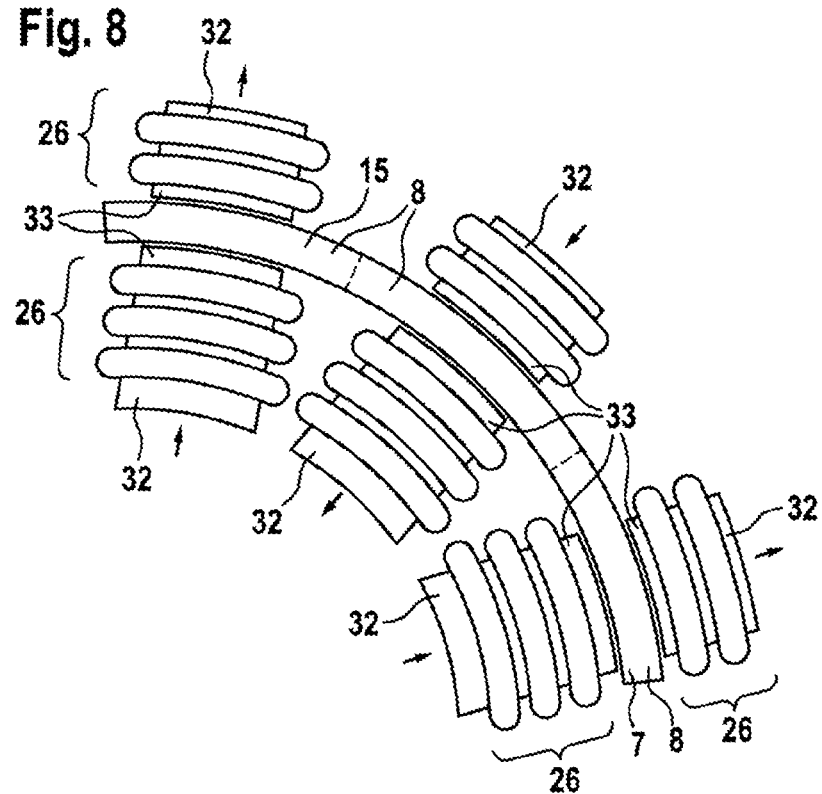
FIG. 8 shows a magnet unit during a production method.

FIG. 8 shows a magnet unit 15 during a production method. A permanent-magnetic material 7 is arranged within a coil arrangement 26. In this case, the coil arrangement 26 comprises six coils, wherein two coils are respectively situated opposite each other and the permanent-magnetic material 7 is arranged between the coils situated opposite each other. FIG. 8 also illustrates coil cores 32 arranged inside the coils of the coil arrangement 26 and having termination plates 33, which are optional. If a current flow is now generated within the coils, magnet segments 8 can be created in the permanent-magnetic material 7. A magnetic field direction of the individual coils is indicated by means of arrows, as a result of which a permanent magnetization 11 is then produced analogously to FIGS. 1 to 7, wherein the magnet unit 15 has three magnet segments 8. If the magnet unit 15 is intended to have a different number of magnet segments 8, the coil arrangement 26 can accordingly have a different number of coils. In this case, the optional coil cores 32 and termination plates 33 can serve for geometrically adjusting the magnetic field in order to create, for example, the axially obliquely running permanent magnetization 17 of FIGS. 4 and 5.

Figure 9:
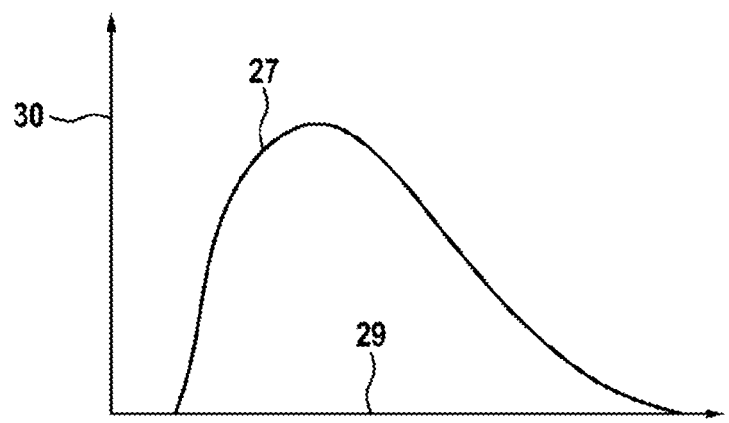
FIG. 9 shows a first current flow profile.

FIG. 9 shows a first current flow 27 within the coil arrangement 26 while creating the permanent magnetization in a graph in which the current intensity 30 is plotted with respect to time 29. The first current flow 27 comprises a semi-sinusoidal current pulse. As an alternative, a different current pulse flowing in one direction can also be used. This current pulse can have a duration of approximately one tenth of a millisecond up to five milliseconds, for example approximately one millisecond.

Figure 10:
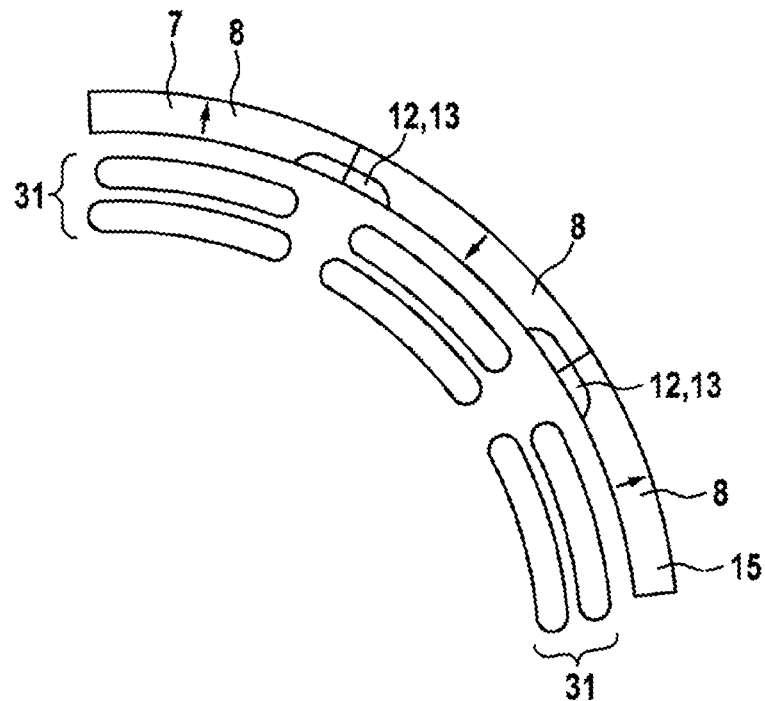
FIG. 10 shows the magnet unit during a subsequent process step.

FIG. 10 shows the magnet arrangement 15 of FIG. 8 adjoining a further coil arrangement 31 with which demagnetized regions 12 can be created within the magnet unit 15 analogously to the exemplary embodiments described in FIGS. 1 to 7. The coils of the further coil arrangement 31 do not have coil cores and termination plates, but these can likewise be provided analogously to FIG. 8.

Figure 11:
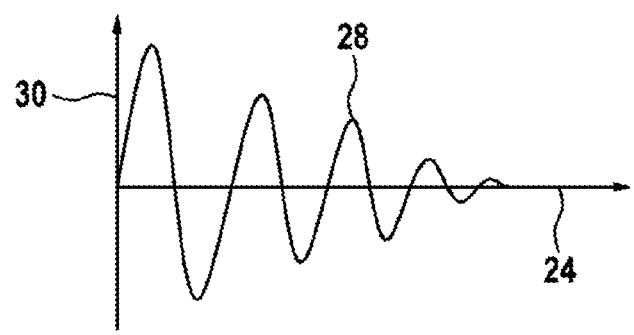
FIG. 11 shows a second current flow profile.

FIG. 11 shows a second current flow 28 within the further coil arrangement 31 while creating the demagnetized regions 12 in a graph in which the current intensity 30 is plotted with respect to time 29. The second current flow 28 comprises an oscillating current pulse with an exponentially decreasing amplitude. As an alternative, a different, oscillating current pulse can also be used. This current pulse can have a duration of approximately one to ten milliseconds.

Provision can be made to allow the second current flow 28 to act on the magnet unit 15 by means of the inner coils of the coil arrangement 26.

As an alternative, the magnet unit 15 of FIGS. 8 and 10 can also already be arranged on the return path element 14, just like possible further magnet units 15 of the permanent-magnet arrangement 2. In this case, all the magnet segments 8 and the demagnetized regions 12 of the permanent-magnet arrangement 2 can be created analogously to the method described for FIGS. 8 to 11.

If the demagnetized regions 12 are created within the coil arrangement 26 shown in FIG. 8 or in a further coil arrangement 31 in which coils are provided on both sides of the magnet unit 15 analogously to FIG. 8, provision can be made to also use the second current flow 28 on the outer coils in order to create the demagnetized regions 12 even more easily.

Although the invention has been described in detail by the preferred exemplary embodiments, the invention is not limited to the examples disclosed and a person skilled in the art can derive other variations from said examples, without departing from the scope of protection of the invention.

What is claimed is:

1. An electric machine (1), having a permanent-magnet arrangement (2) and an electromagnet arrangement (3), wherein the electromagnet arrangement (3) has a first number of field coils (4), wherein the field coils (4) are each wound around a pole core (5) and wherein the permanent-magnet arrangement (2) has a second number of magnet segments (8) formed from a permanent-magnetic material (7), wherein an air gap (9) is arranged between the electromagnet arrangement (3) and the permanent-magnet arrangement (2), wherein the magnet segments (8) have a permanent magnetization (11) in a first magnet segment volume (10), wherein at least one magnet segment (8) has a demagnetized region (12) in a second magnet segment volume (13).

2. The electric machine (1) as claimed in claim 1, wherein all the magnet segments (8) have a demagnetized region in a second magnet segment volume (13).

3. The electric machine (1) as claimed in claim 1, wherein the permanent-magnet arrangement (2) is arranged outside the electromagnet arrangement (3), wherein the permanent-magnet arrangement (2) has an encircling magnetic return path element (14), wherein the magnet segments (8) are arranged on the return path element (14).

4. The electric machine (1) as claimed in claim 1, wherein a plurality of magnet segments (8) form a magnet unit (15).

5. The electric machine (1) as claimed in claim 4, wherein the demagnetized region (12) is arranged at a transition (16) between two magnet segments (8) of a magnet unit (15).

6. The electric machine (1) as claimed in claim 1, wherein a magnet segment (8) has an axially obliquely running permanent magnetization (17).

7. The electric machine (1) as claimed in claim 1, wherein a magnet segment (8) has a magnet segment surface (18) and wherein the magnet segment surface (18), on account of the permanent magnetization (11) and the demagnetized region (12), has a transition (19) from a first permanent-magnetic field strength (20) to a second permanent-magnetic field strength (21).

8. The electric machine (1) as claimed in claim 1, wherein the permanent-magnet arrangement (2) is arranged on a rotor (24) of the electric machine (1), wherein the electromagnet arrangement (3) is arranged on a stator (25) of the electric machine (1), wherein a magnetic field of the electromagnet arrangement (3) is reversed by reversing a polarity of the field coils (4).

9. The electric machine (1) as claimed in claim 1, wherein the permanent-magnet arrangement (2) is arranged on a stator (25) of the electric machine (1), wherein the electromagnet arrangement (3) is arranged on a rotor (24) of the electric machine (1).

10. The electric machine (1) as claimed in claim 1, wherein each magnet of the magnet segments (8) has the demagnetized region (12) in the second magnet segment volume (13), wherein the second magnet segment volume (13) includes a first demagnetized region and a second demagnetized region, wherein the first and second demagnetized regions are arranged at a transition (16) of adjacent magnets of the magnet segments (8) and at ends (34) of magnets of the magnet segments (8).

11. A method for producing an electric machine (1) comprising the following steps:
providing an electromagnet arrangement (3) having a first number of field coils (4), wherein the field coils (4) are each wound around a pole core (5);
providing a permanent-magnet arrangement (2), wherein the permanent-magnet arrangement (2) has a second number of magnet segments (8) formed from a permanent-magnetic material (7), wherein the magnet segments (8) have a permanent magnetization (11) in a first magnet segment volume (10), wherein at least one magnet segment (8) has a demagnetized region (12) in a second magnet segment volume (13);
arranging the electromagnet arrangement (3) and the permanent-magnet arrangement (2) with an air gap (9) between the electromagnet arrangement (3) and the permanent-magnet arrangement (2).

12. The method as claimed in claim 11, wherein the permanent-magnet arrangement (3) is provided by way of the permanent-magnetic material (7) initially being magnetized by a first current flow (27) in a coil arrangement (26) for creating the magnet segments (8) and the demagnetized region (12) then being created in at least one magnet segment (8) by a second current flow (28) in the coil arrangement (26) or a further coil arrangement (31).

13. The method as claimed in claim 12, wherein the first current flow (27) comprises a semi-sinusoidal current pulse and wherein the second current flow (28) comprises an oscillating current pulse with an exponentially decreasing amplitude.

14. The method as claimed in claim 11, wherein each magnet of the magnet segments (8) has the demagnetized region (12) in the second magnet segment volume (13), wherein the second magnet segment volume (13) includes a first demagnetized region and a second demagnetized region, wherein the first and second demagnetized regions are arranged at a transition (16) of adjacent magnets of the magnet segments (8) and at ends (34) of magnets of the magnet segments (8).

* * * * *